(12) United States Patent
Mathew et al.

(10) Patent No.: US 11,632,423 B1
(45) Date of Patent: Apr. 18, 2023

(54) SCALING OF SERVICES IN A DISTRIBUTED SYSTEM

(71) Applicant: Dell Products L.P., Round Rock, TX (US)

(72) Inventors: George Mathew, Belmont, CA (US); Keyur Desai, Cary, NC (US); Shefali Gautam, San Mateo, CA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/725,002

(22) Filed: Apr. 20, 2022

(51) Int. Cl.
  *H04L 67/1031* (2022.01)
  *H04L 67/101* (2022.01)
  *H04L 61/00* (2022.01)

(52) U.S. Cl.
  CPC .......... *H04L 67/1031* (2013.01); *H04L 61/35* (2013.01); *H04L 67/101* (2013.01)

(58) Field of Classification Search
  None
  See application file for complete search history.

(56) References Cited

U.S. PATENT DOCUMENTS

| | | | |
|---|---|---|---|
| 10,630,582 B1* | 4/2020 | Deb | H04L 45/586 |
| 11,140,220 B1* | 10/2021 | Coleman | H04L 67/1031 |
| 2015/0169291 A1* | 6/2015 | Dube | H04L 41/5006 717/101 |
| 2017/0339196 A1* | 11/2017 | Lewis | H04L 63/083 |
| 2018/0143852 A1* | 5/2018 | Ballantyne | G06F 9/5072 |
| 2022/0210232 A1* | 6/2022 | Chen | H04L 41/0806 |

* cited by examiner

*Primary Examiner* — Mohamed Ibrahim
(74) *Attorney, Agent, or Firm* — Staniford Tomita LLP (57) ABSTRACT

Embodiments for scaling services in a distributed network by registering bucket names for the services with a Domain Name Service (DNS) server. Buckets hold resources and distribution of buckets to servers is maintained using a Consistent Hashing Ring. Upon determining that services servers need to be added or deleted based on changes load conditions, leave/join events are managed by a Kubernetes event service and updates are propagated to all of the services by the membership service component. A service scaling process updates the mapping of buckets to the host name of the new service server. A resource request from a client is sent to the mapped bucket name, and a DNS resolver process sends it to the changed service server so that the client is completely unaware of this change in bucket ownership.

20 Claims, 9 Drawing Sheets

| DLM Server:<br>dlm_ms_01 | DLM Server:<br>dlm_ms_02 | DLM Server:<br>dlm_ms_03 | DLM Server:<br>dlm_ms_04 |
|---|---|---|---|
| Bucket Names:<br>• bucket_1<br>• bucket_2<br>⋮<br>• bucket_32 | Bucket Names:<br>• bucket_33<br>• bucket_34<br>⋮<br>• bucket_64 | Bucket Names:<br>• bucket_65<br>• bucket_66<br>⋮<br>• bucket_96 | Bucket Names:<br>• bucket_97<br>• bucket_98<br>⋮<br>• bucket_128 |

| DLM Server: dlm_ms_01 -> 10.227.100.26 | DLM Server: dlm_ms_02 -> 10.227.100.27 |
|---|---|
| Bucket Names:<br>• bucket_1 -> 10.227.100.26<br>• bucket_2 -> 10.227.100.26<br>⋮<br>• bucket_32 -> 10.227.100.26 | Bucket Names:<br>• bucket_33 -> 10.227.100.27<br>• bucket_34 -> 10.227.100.27<br>⋮<br>• bucket_64 -> 10.227.100.27 |

| DLM Server: dlm_svc_1->10.227.100.26 | DLM Server: dlm_svc_2-> 10.227.100.27 |
|---|---|
| Bucket Names:<br>• bucket_1 -> 10.227.100.26<br>• bucket_2 -> 10.227.100.26 | Bucket Names:<br>• bucket_3 -> 10.227.100.27<br>• bucket_4 -> 10.227.100.27 |

SCALING OF SERVICES IN A DISTRIBUTED SYSTEM

TECHNICAL FIELD

Embodiments are generally directed to distributed networks, and specifically to scaling services running in the network.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Clustered network systems represent a scale-out solution to single node systems by providing networked computers that work together so that they essentially form a single system. Each computer forms a node in the system and runs its own instance of an operating system. The cluster itself has each node set to perform the same task that is controlled and scheduled by software.

A distributed file system is a type of file system in which data may be spread across multiple storage devices as may be provided in a cluster. The distributed file system can present a global namespace to clients in a cluster accessing the data so that files appear to be in the same central location. Distributed file systems are typically very large and may contain many hundreds of thousands or even many millions of files, as well as services (applications) that use and produce data.

There are typically many multiple services running in a cluster. As load on a single service instance in a cluster increases, more service instances/nodes need to be added to accommodate this need. This involves load balancing or sharding of resources that each instance of a service can handle. Such load balancing is often a processor-intensive task and can be disruptive to applications running in the cluster.

What is needed, therefore, is a scaling method for clustered systems that involves minimum re-shuffling of the resources owned by a service and transparency to the clients using these resources.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a system and method that can be used to scale services in a cluster in a way that is completely transparent to a client so that clients can continue to use the service without any disruption.

Figure 1:
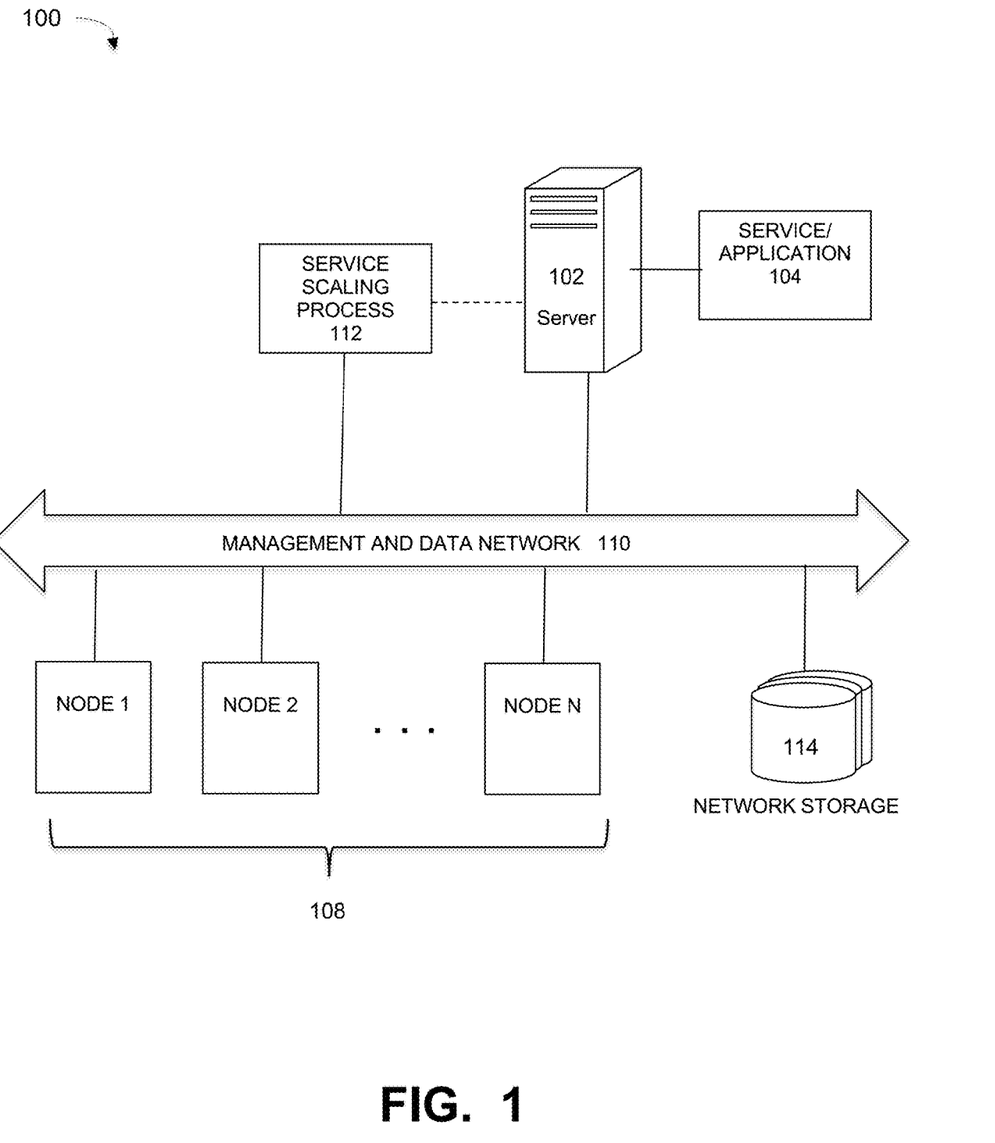
FIG. 1 is a block diagram of illustrating a distributed system implementing a service scaling process, under some embodiments.

FIG. 1 is a block diagram of illustrating a distributed system implementing a service scaling process, under some embodiments. System 100 comprises a large-scale network that includes a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and server 102 through network 110. Theses client compute nodes may include installed agents or other resources to process the data of application 104. The application at the server 102 communicates with the nodes via the control path of network 110 and coordinates with certain agent processes at each of the nodes 108 to perform application functions of the distributed file system.

The network 110 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform.

For the example network environment 100 of FIG. 1, server 102 is an application server that executes one or more applications or processes 104 that processes data in the system using one or more nodes 108. One typical application is a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell/EMC™ Corporation.

As shown in FIG. 1, system 100 includes a service scaling process 112 that is executed by the system to manage and coordinate scaling of the system. Scaling of the system generally means adding or subtracting nodes in the system to accommodate an increase in service load or a decrease in the service load for the existing nodes in the cluster. Thus, if the system initially comprises 10 nodes (1-10) and the load increases, additional nodes 11 to N may be spawned. Likewise, if the load decreases, the system can lose nodes to save resources such as by scaling down to nodes 1-8, for example.

Embodiments of the service scaling process 112 provide such scaling by dividing a resource that a service provides into a set of buckets where each instance of a service is the owner of a set of bucket. As service instances are added or removed from a cluster, the system receives an ordered set of reconfiguration events with a membership list, indicating the services added or removed. Buckets are re-distributed among different service instances upon receiving the reconfiguration events. This mechanism establishes a membership group among the nodes so that scaling changes are propagated to all of the constituent nodes, and the applications see scaling events in the same order, where the events comprise nodes joining or leaving the system as it scales up or down. Thus, if a node joins followed by another node leaving, all services and nodes should see these events in the same order. To accomplish this, each service effectively has a state machine that moves from one state to another in the same way. This ensures that decision taken by one service is the same as another with respect to membership of nodes in the system.

As shown in FIG. 1, process 112 may be a process executed by a specialized node as a specially configured management or control node in system 100. Alternatively, it may be executed as a server process, such as by server 102 or any other server or client computer in the system. The service scaling process 112 works with the other components of the distributed system and may use certain services or agents that run on each compute node 108 in the distributed system, such as may be implemented as a daemon process running in each node. As understood, a daemon is a computer program that runs as a background process, rather than being under the direct control of an interactive user.

In an embodiment, system 100 uses Kubernetes as an orchestration framework for clustering the nodes 1 to N in FIG. 1. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software. Because resources are shared in this way, application containers can be created that place less strain on the overall resources available.

Containerization technology involves encapsulating an application in a container with its own operating environment, and the well-established Docker program deploys containers as portable, self-sufficient structures that can run on everything from physical computers to VMs, bare-metal servers, cloud clusters, and so on. The Kubernetes system manages containerized applications in a clustered environment to help manage related, distributed components across varied infrastructures. Certain applications, such as multi-sharded databases running in a Kubernetes cluster, spread data over many volumes that are accessed by multiple cluster nodes in parallel. For application consistency, programs, such as DLM, must be able to guarantee cross-cluster consistency in the context of an application consistent execution.

In an embodiment, the container management layer 104 is implemented as a Kubernetes platform, which is an open-source platform for automating deployments, scaling, and operations of application containers across clusters of hosts, providing container-centric infrastructure. In a Kubernetes system, a cluster consists of at least one cluster master and multiple worker machines called nodes. A cluster is the foundation the system and the Kubernetes objects that represent the containerized applications all run on top of a cluster.

Figure 2:
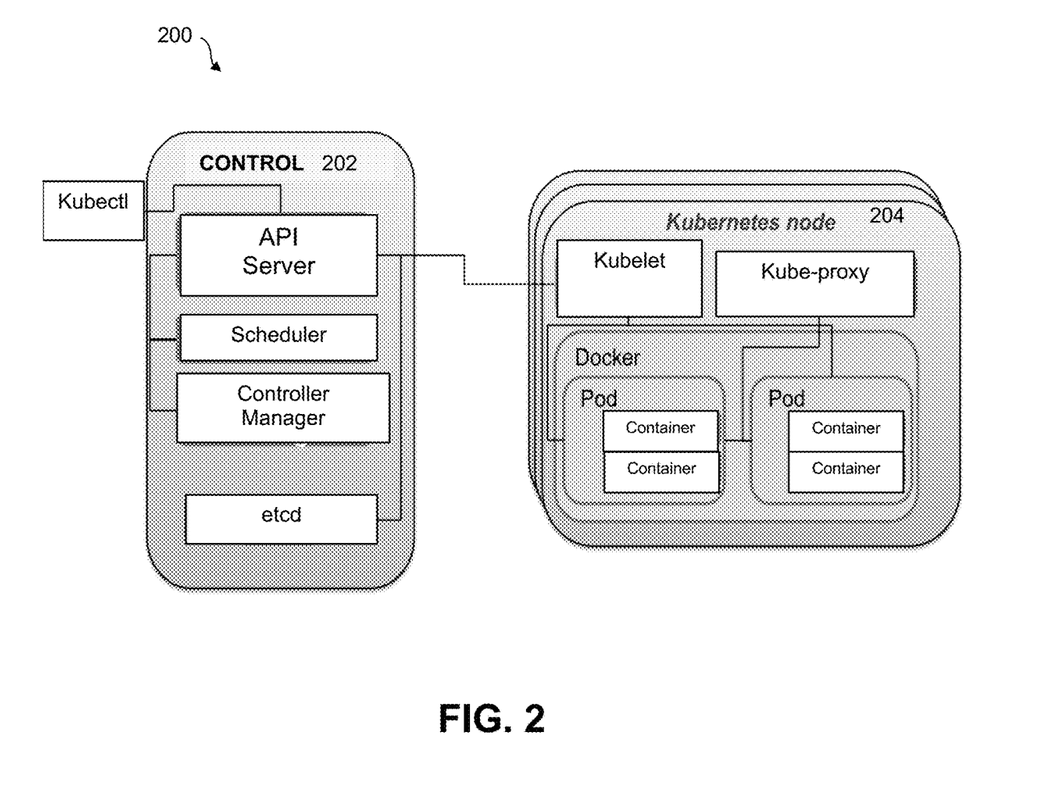
FIG. 2 is a block diagram that illustrates the architecture of a Kubernetes platform implementing a service scaling process, under some embodiments.

FIG. 2 is a block diagram 200 that illustrates the architecture of a Kubernetes platform implementing an service scaling process 112, under some embodiments. The controlling services in a Kubernetes cluster are called the control plane 202 components. These operate as the main management contact points for administrators, and also provide many cluster-wide systems for the relatively dumb worker nodes. These services can be installed on a single machine, or distributed across multiple machines. The servers running these components have a number of unique services that are used to manage the cluster's workload and direct communications across the system.

Within the control plane is an API server that allows a user to configure many of Kubernetes' workloads and organizational units. It also is responsible for making sure that the etcd store (which stores configuration data to be used by the nodes) and the service details of deployed containers are in agreement. It acts as the bridge between various components to maintain cluster health and disseminate information and commands. The API server implements a RESTful interface, which means that many different tools and libraries can readily communicate with it. A client called kubecfg is packaged along with the server-side tools and can be used from a local computer to interact with the Kubernetes cluster.

The controller manager service is a general service that has many responsibilities. It is responsible for a number of controllers that regulate the state of the cluster and perform routine tasks. For instance, the replication controller ensures that the number of replicas defined for a service matches the number currently deployed on the cluster. The details of these operations are written to e t cd, where the controller manager watches for changes through the API server. When a change is seen, the controller reads the new information and implements the procedure that fulfills the desired state. This can involve scaling an application up or down, adjusting endpoints, and so on.

The scheduler assigns workloads to specific nodes in the cluster. This is used to read in a service's operating requirements, analyze the current infrastructure environment, and place the work on an acceptable node or nodes. The scheduler is responsible for tracking resource utilization on each host to make sure that workloads are not scheduled in excess of the available resources. The scheduler must know the total resources available on each server, as well as the resources allocated to existing workloads assigned on each server.

In Kubernetes, servers that perform work are known as nodes 204. Node servers have a few requirements that are necessary to communicate with the control plane components 402, configure the networking for containers, and run the actual workloads assigned to them. The first requirement of each individual node server is docker. The docker service is used to run encapsulated application containers in a relatively isolated but lightweight operating environment. Each unit of work is, at its basic level, implemented as a series containers that must be deployed.

The main contact point for each node with the cluster group is through a small service called kubelet. This service is responsible for relaying information to and from the control plane services, as well as interacting with the etcd store to read configuration details or write new values. The kubelet service communicates with the control plane components to receive commands and work. Work is received in the form of a "manifest" which defines the workload and the operating parameters. The kubelet process then assumes responsibility for maintaining the state of the work on the node server. To allow individual host subnetting and make services available to external parties, a small proxy service is run on each node server. The proxy forwards requests to the correct containers, performs load balancing, and other functions.

While containers are used to deploy applications, the workloads that define each type of work are specific to Kubernetes. Different types of 'work' can be assigned. Containers themselves are not assigned to hosts. Instead, closely related containers (that should be controlled as a single 'application') are grouped together in a pod. This association leads all of the involved containers to be scheduled on the same host. They are managed as a unit and they share an environment so that they can share volumes and IP space, and can be deployed and scaled as a single application. Pods can be thought of as a single virtual computer and is the basic building block of Kubernetes and comprises one or more containers and share storage resources, and network resources. Pods run in a shared context and share the same IP using different port for containers.

In Kubernetes, source material is often expressed as a parameterized template. A tool processes the template by executing any embedded scripting and replaces parameters with desired values to generate a particular configuration. Different sets of values using the same template allow for convenient reuse of containers. One way to handle templates is with Helm, which is the package manager for Kubernetes, which includes templating capabilities and works at the application level to allow multiple manifests to be deployed together.

A Kubernetes organizational concept outside of the work-based units is labeling. A label is basically an arbitrary tag that can be placed on the above work units to mark them as The controller or the administrator can manage all of the instances as a group, regardless of how many containers have been spawned. Labels are given as key-value pairs. Each unit can have more than one label, but each unit can only have one entry for each key. Pods can be given a name key as a general purpose identifier, or they can be classified by various criteria such as development stage, public accessibility, application version, etc. In many cases, many labels can be assigned for fine-grained control. A user can then select based on a single or combined label requirements.

Figure 3:
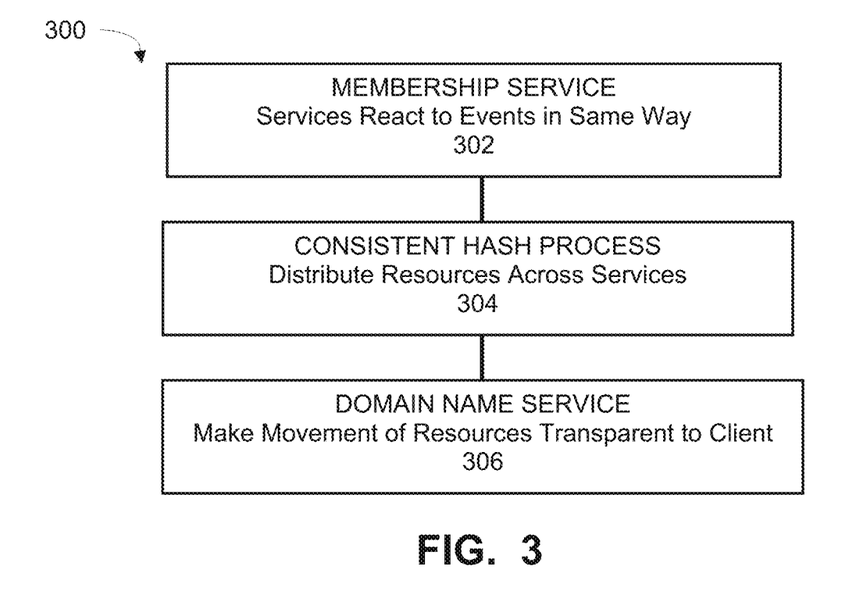
FIG. 3 is a block diagram that illustrates functional components for a service scaling process for distributed networks, under some embodiments.

FIG. 3 is a block diagram that illustrates functional components of a scaling service for distributed networks, under some embodiments. A first component of system 300 comprises a membership service component. An ordered set of events are facilitated by this cluster membership service, which keeps a record of the services/nodes joining and/or leaving a cluster. Additionally, it acts as a serializer of service add or leave events (e.g., Kubernetes events) and delivers service membership events in a priority order.

The second component 304 is a consistent hash process (or similar) that distributes resources across the services. This process only needs to know the membership and the availability of resources in the system. Since every service see the events in the same order, these services see the membership and can associate resources to the services. This solves the consistent hashing problem.

The third component 306 is a domain name service (or similar) that makes movement of resources (add/delete nodes) transparent to the client.

Through these components, upon receiving any cluster membership change event, individual services drop or add ownership of various resources they own and rebalance the resources amongst them, thus facilitating load balancing/sharding of resources. Any client that utilizes a service is completely unaware of change in the ownership of these resources.

In general, a service can be any application or program that consumes resources provided among a number of nodes in a cluster. It can be embodied as, for example, a thread pool where a certain set of threads allocate resources among nodes in a cluster for a service. Embodiments will be described and illustrated with respect to a Distributed Lock Manager (DLM) service, but embodiments are not so limited and any other similar service may also be used.

With respect to the DLM service provided by a Distributed Lock Manager server, the purpose of DLM Server service is to grant locks to different DLM clients. If the DLM lock request is in conflict with the DLM lock held by another node, the DLM Server service revokes the DLM lock from that client. As a load on a single DLM server increases, more DLM service instances needs to be added to process DLM locks. This involves certain load balancing/sharding of DLM locks that each DLM server could handle. Embodiments of process 112 provide a mechanism for a DLM client to find which DLM server its DLM lock should be sent to for processing. Additionally, during addition of a DLM server and/or the removal of a DLM server (e.g., during scalability or outage), minimum re-shuffling of the existing DLM bucket ownership should take place.

For the DLM example, the resource consumed by a client is a lock. Each lock is hashed to a bucket and buckets are distributed among and owned by a service. Locks are thus hashed to buckets and buckets are owned by services, and when new a service comes up, the system moves buckets around in a manner that is transparent to the client.

Distributed locking is an important task in cluster networks. Locking prevents a node from processing a data asset and/or using a system resource, and properly distributing a lock is necessary to ensure that only one out of several possible nodes perform work on an asset at any one time, for example to perform a computation, write data to a shared storage system, call an external API, and so on. Locks are used to maintain correctness and ensure efficiency. Taking a lock prevents the system from unnecessarily doing the same work twice, in that if a lock fails and two nodes do the same work, repetitive functions are performed, which is inefficient. More importantly, taking a lock prevents concurrent processes from interfering or corrupting one another, which can lead to data loss, corruption, inconsistency, and so on.

During normal operation, a distributed lock is acquired by a client that then reads the data, performs its process and writes the data back and then releases the lock. For example, if a client needs to update a file, it first acquires the lock, reads the file from storage, makes changes, writes the file back to storage, and then releases the lock. This lock prevents another client from performing this read-modify-write cycle at the same time on the same file.

Figure 4:
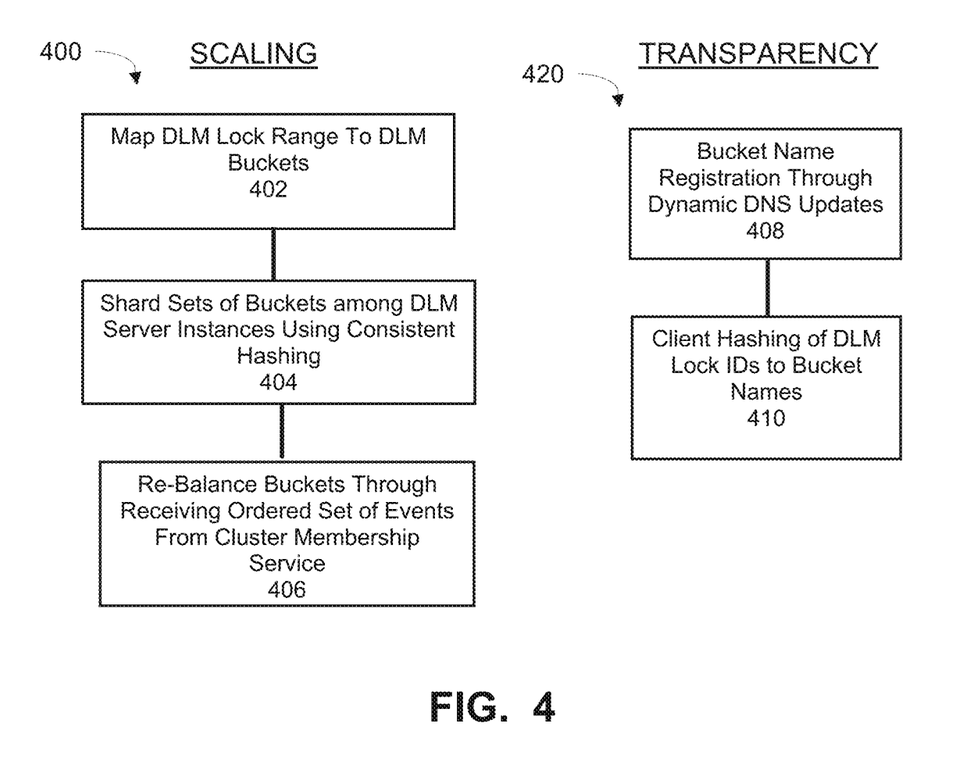
FIG. 4 is a flowchart that illustrates a method of scaling a Distributed Lock Manager service, under an example embodiment.

FIG. 4 is a flowchart that illustrates a method of scaling a Distributed Lock Manager service, under an example embodiment. As shown in process 400, the scaling of a DLM service involves scaling of DLM Servers (as nodes) and sharding of DLM locks (as resources). A first step is mapping to DLM lock range to DLM buckets, 402. Sets of buckets are sharded amongst DLM server instances via Consistent Hashing, 404. The process re-balances buckets upon DLM service/instance addition or removal through receiving ordered set of events from the cluster membership service, 406.

This scaling process 400 is performed in a manner completely transparent to DLM clients through process 420 that involves bucket name registration via Dynamic DNS updates, 408, and client hashing of DLM lock IDs to bucket names, 410.

For the scaling of DLM servers and sharding of DLM locks 400, a range of DLM locks are mapped to different buckets. For example, if there are 1280 DLM locks and 128 buckets, each bucket could be mapped to 10 DLM locks. These 128 DLM buckets are owned by different DLM Server service instances. For example, if there are 4 DLM server instances, each DLM server instance could own 32 DLM buckets and process (Grant plus Revoke) DLM locks within their range. Ownership of buckets by each DLM Server has to be consistent across reboots, and any addition and/or deletion of DLM server instances should result in minimal disruption of DLM locks already owned. Ownership of DLM buckets is distributed to different DLM servers via a consistent hashing algorithm.

Consistent hashing is a hashing technique such that when a hash table is resized, only n/m keys need to be remapped on average where n is the number of keys and m is the number of buckets. In contrast, in most traditional hash tables, a change in the number of array buckets causes nearly all keys to be remapped because the mapping between the keys and the buckets is defined by a modular operation. Consistent hashing, on the other hand, is particularly useful in the example embodiment where an addition of a DLM server and the removal of a DLM server (e.g., during scalability or outage) requires only n/n items to be re-shuffled when the number of DLM servers changes.

A simple hash ring technique will be used to demonstrate sharding of DLM locks to different DLM servers using consistent hashing. The DLM hash ring algorithm could expose a simple API to create/remove hash rings or add/remove DLM server nodes.

A DLM hash ring algorithm is initialized via the following function:

dlm_hash_ring_create (num_buckets, hash_function)

Figure 5:
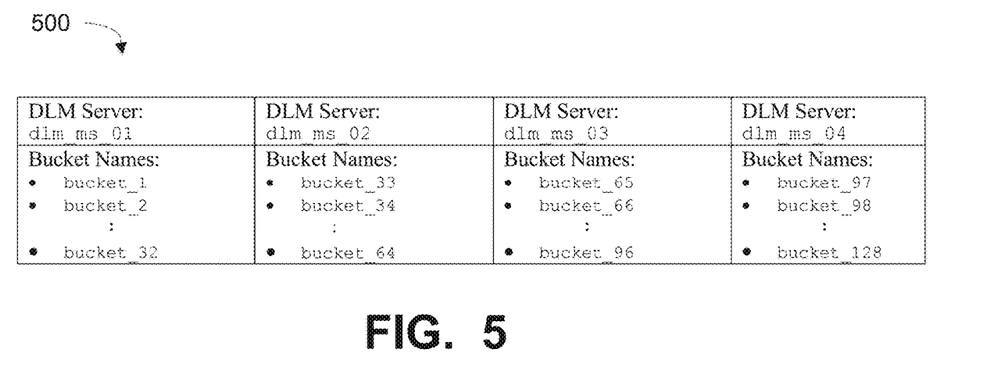
FIG. 5 is a table that lists example buckets assigned to different DLM servers, under an example embodiment.

In the above equation, the variable num_buckets determines how many hash buckets are present on a ring. This parameter gives flexibility with respect to how consistent is the ring, with larger values evening out the distribution of DLM locks to different DLM servers on the ring. The expression hash_function is the hash function to use. If the process uses SHA1 for hashing, the expression becomes:

dlm_hash_ring_t*ring=dlm_hash_ring_create
(128,HASH_FUNCTION_SHA1);

Next, the DLM server is added to the DLM consistent hash ring. For example, if you there is a cluster of four DLM servers, this may be described as:

char *dlm_ms_01="dlm_ms_01";/*IP 10.227.100.26 */
char *dlm_ms_02="dlm_ms_02";/*IP 10.227.100.27 */
char *dlm_ms_03="dlm_ms_03";/*IP 10.227.100.28 */
char *dlm_ms_04="dlm_ms_04";/*IP 10.227.100.29 */
dlm_hash_ring_add_ms(ring, dlm_ms_01)
dlm_hash_ring_add_ms(ring, dlm_ms_02);
dlm_hash_ring_add_ms(ring, dlm_ms_03);
dlm_hash_ring_add_ms(ring, dlm_ms_04);

The DLM Consistent hash ring will now have 128 buckets, 32 buckets per DLM werver (with 4 nodes total). So, in this case, the DLM bucket ownership could look like the assignments illustrated in Table 500 of FIG. 5. As shown in FIG. 5, Table 500 lists the bucket names for each of the four DLM servers, dlm_ms_01 to dlm_ms_03. This initial distribution can be changed due to scaling of the system in which new DLM servers are added or existing DLM servers leave the network. In the case of such a scaling event (join or leave), the buckets are re-balanced among the new set of buckets through the service scaling process 112.

Kubernetes has an event service to monitor services that join and leave the system. In an embodiment, this is interpolated by the service scaling process 112 with the membership service to order the events to enable scaling nodes and resources (e.g., service servers) in the system.

Figure 6:
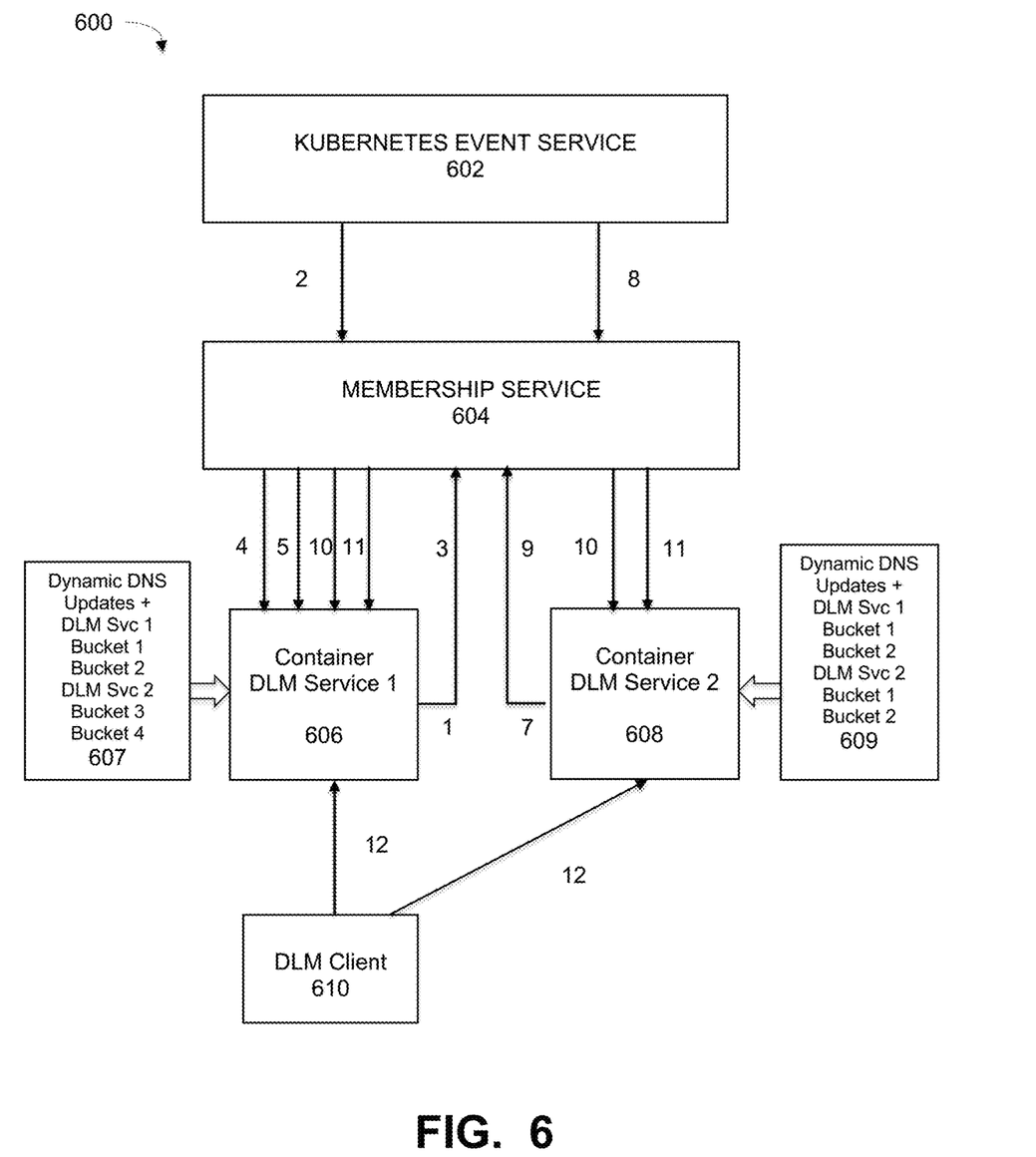
FIG. 6 is a combination block/flow diagram that illustrates scaling of DLM services, under an example embodiment.

FIG. 6 is a combination block/flow diagram that illustrates scaling of DLM services, under an example embodiment. As shown in system 600, Kubernetes event service 602 works with membership service 604 to manage and scale DLM services such as DLM service 1 (606) and DLM service 2 (608) that are used by one or more DLM clients 610. Each service or service server is encapsulated in a respective container. The membership mechanism lets each server know how many server copies exists so that each server can reliably find out what buckets need to be dropped. The membership mechanism also provides a barrier sync logic by which the servers that need to drop buckets can do so before servers that are supposed to pick it actually do pick it.

The Kubernetes event service adds events through a Kubernetes Service Add event message (2, 8) for initial and added (or deleted) services, 606 and 608). Upon an initial startup (1), a service (e.g., DLM service 1) initializes and registers with the membership service component 604. A new service added (e.g., DLM service 2) can also initialize (7), and through a subscription process (3, 9) the service provides information about the services and gets information from the Kubernetes event service about the join or leave status (10, 11) of other services in the system. The leave message (10) can be expressed as Leave svc_event[ ], and the join event can be expressed as Join svc_event [dlm_svc_2], for example. The membership service 604 monitors additions and deletions of services, thus, for the example of FIG. 6, DLM service 606 may initially leave the network through Leave svc_event[ ] (4) and then re-join through Join svc_event[dlm_svc_1] (5), and then leave and join again (10, 11), and so on. It should be noted that adding a new service in the network generates a leave and join event for all of the services in the network, thus when DLM service 2 is added, a leave and join event (10, 11) is generated for both service 1 and service 2.

Each service 606, 608 has associated with it respective information 607, 609 such as Dynamic DNS updates and bucket ownership by each of the active services. For the DLM application example, the DLM client 610 may initiate lock requests 12 to one or both of the DLM services as needed.

The service scaling process 112 uses the event service, membership service, and DNS update process to re-balance the buckets upon service joins or leaves (additions/deletions) through receiving ordered sets of events from the membership service. As shown in FIG. 6, upon addition of a DLM server instance, the system will receive an ordered set of events (Join and Leave) and an updated set of membership list from the cluster membership service 604. The Leave callback will drop the current bucket ownership on both DLM server services 606, and 608. The Join callback will lead to rebuild of consistent hash ring in each DLM Server service. Each DLM server service will now be the owner of different buckets, as shown in 607 and 609.

For example, assume that the initial bucket ownership was that DLM service 1 owned bucket_1, bucket_2, bucket_3, bucket_4, and that the addition of DLM service 2 lead to re-distribution of bucket ownership to become: DLM service 1 owns bucket_1 and bucket_2; and DLM service 2 owns bucket_3, bucket_4. This same logic can be applied upon bucket rebalancing and node deletion, and the scaling is completely transparent to DLM clients (e.g., 610).

In an embodiment, system 100 uses a Domain Name Service (DNS) or similar means to provide transparent scaling to the clients. During DLM server initialization and/or upon receiving membership change events, bucket names are registered with the DNS server dynamically. When a DLM client requests a DLM lock, the lock ID (<lck_type>:<mid>:<sid>:<inum>) is hashed to a DLM bucket ID/name. The DLM client opens a connection to the bucket name and sends a DLM lock grant request to that bucket name. For example:

DLM Lock ID: 01:11:21:0031,
SHA1("01:11:21:0031")=35fadec76245a11c=Mapped to DLM bucket_1

DLM Client opens connection to bucket_1 (which send DLM lock grant request to DLM server dlm_ms_01→10.227.100.26)

Figure 7:
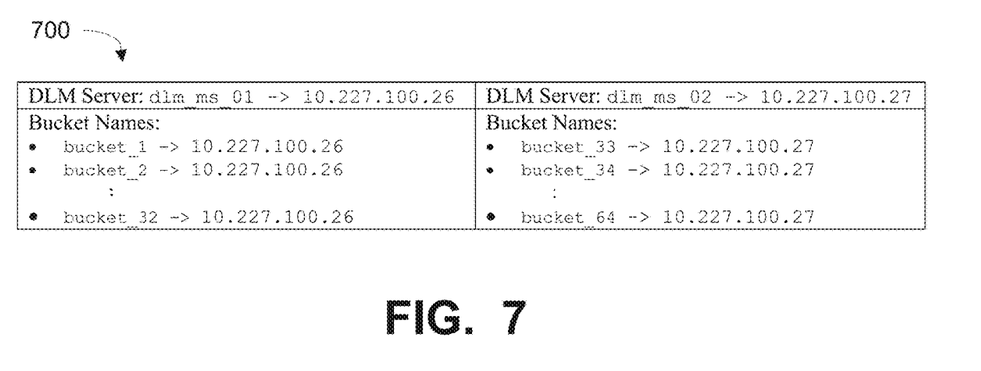
FIG. 7 is a table illustrating example bucket names mapped a DLM server that owns the buckets, under an example embodiment.

Multiple bucket names are mapped to the name/IP of the DLM server that owns the bucket. In case of the above example, the DNS records would correspond to the entries of Table 700 shown in FIG. 7. As shown in FIG. 7, server 10.227.100.26 owns buckets 1 to 32 and DLM server 10.227.100.27 owns buckets 33 to 64.

Figure 8:
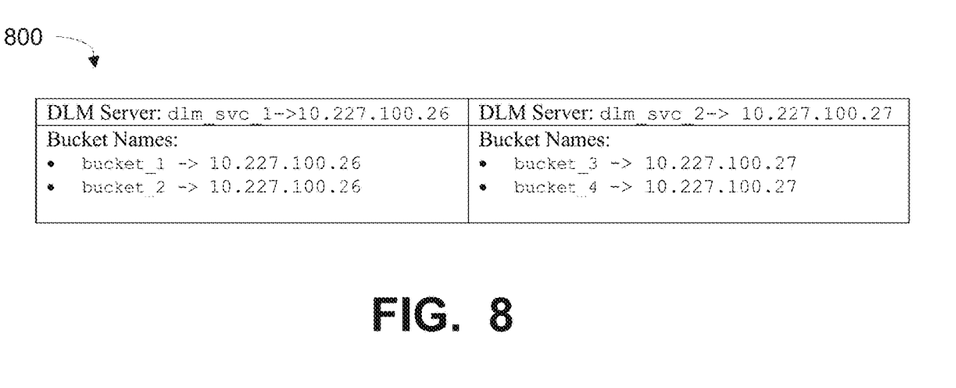
FIG. 8 is a table illustrating a dynamic update of DLM server name for new service ownership, under an example embodiment.

When the bucket ownership changes to a different DLM server, the DNS records are updated dynamically. FIG. 8 is a table illustrating a dynamic update of DLM server name for new service ownership, under an example embodiment. For this example, buckets 3 and 4 move from server . . . 100.26 to . . . 100.27

The use of DNS processes allows service scaling to be transparent to the clients. Bucket name registration is accomplished via dynamic DNS updates, and client hashing of DLM lock IDs to bucket names. When the bucket ownership changes to a different DLM server, DNS records are updated dynamically meaning that DLM clients can continue to send DLM lock requests to their mapped bucket names, and the DNS resolver will send them to the changed DLM server owner. The DLM clients are completely unaware of this change in bucket ownership. The dynamic DNS lookup is not only a means of reaching the node, it is a means of reaching the node that actually owns the DLM lock. The ownership of DLM locks/buckets can change due to lock sharding or adding/removal of node. A Consistent Hashing process is used to ensure that when the re-configuration of DLM lock/bucket ownership happens, there is minimal change in the ownership of existing DLM locks/buckets. Dynamically updating DNS bucket name entries, ensures that the DLM clients are completely transparent to change in bucket ownerships.

Figure 9:
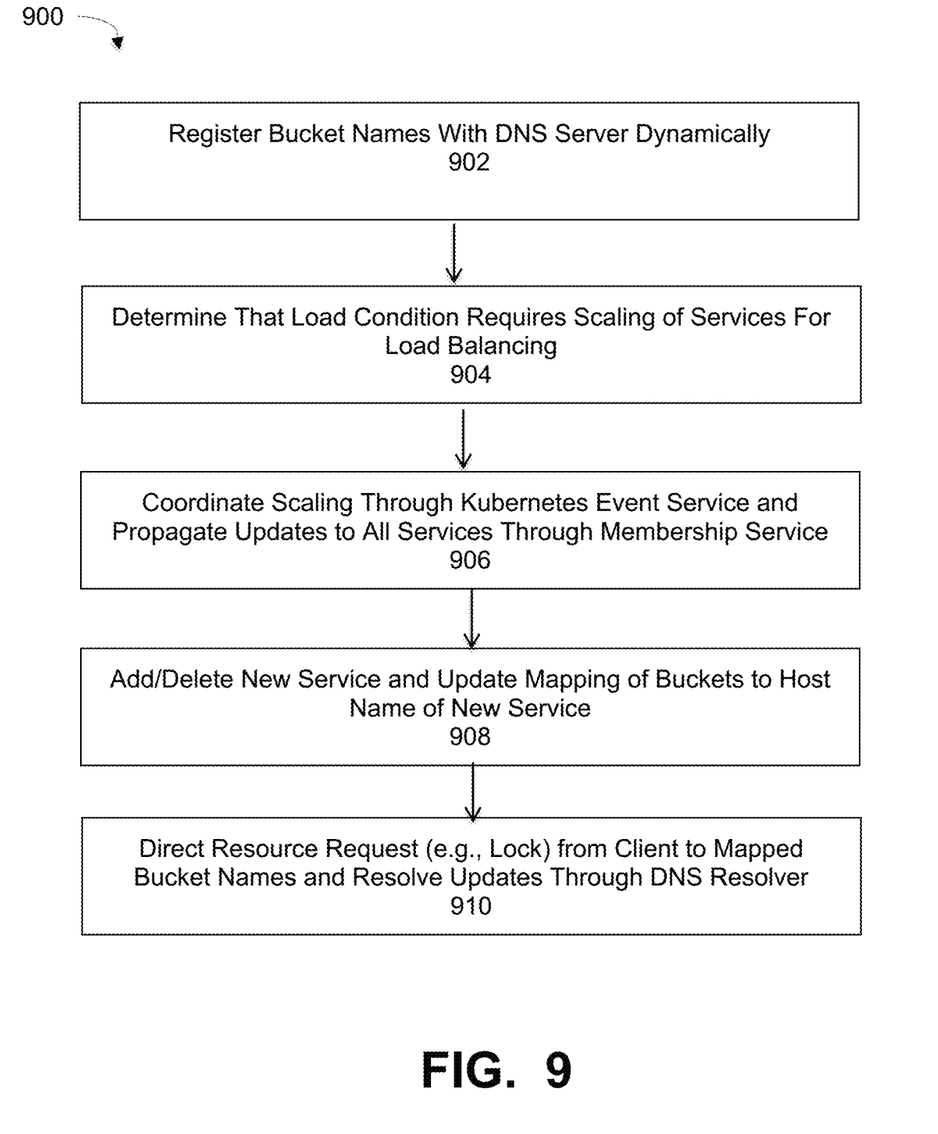
FIG. 9 is a flowchart that illustrates an overall process of scaling a service using a membership service with Kubernetes container management and DNS processes, under some embodiments.

FIG. 9 is a flowchart that illustrates an overall process of scaling a service using a membership service with Kubernetes container management and DNS processes, under some embodiments. As shown in FIG. 9, process 900 starts by registering bucket names for the services with the DNS server, 902. During normal system operation, it may be determined that services servers need to be added or deleted based on changes in demand or load conditions on the cluster nodes, 904. The leave/join (addition/deletion) events for the up or down scaling are managed by the Kubernetes event service 602, and these updates are propagated to all of the services by the membership service component 604, step 906. The scaled service is added or deleted as appropriate, and the service scaling process 112 updates the mapping of buckets to the host name of the new service server, 908. A resource request from a client is sent to the mapped bucket name, and the DNS resolver will then send it to the changed DLM server, if the bucket is now owned by that server, 910. The clients are completely unaware of this change in bucket ownership. For the example of a DLM system, if a DLM client requests a DLM lock from a DLM server service that does not own the lock, the DLM client will receive a "Not Owner" error message and will be re-directed to the new owner of the DLM lock.

Figure 10:
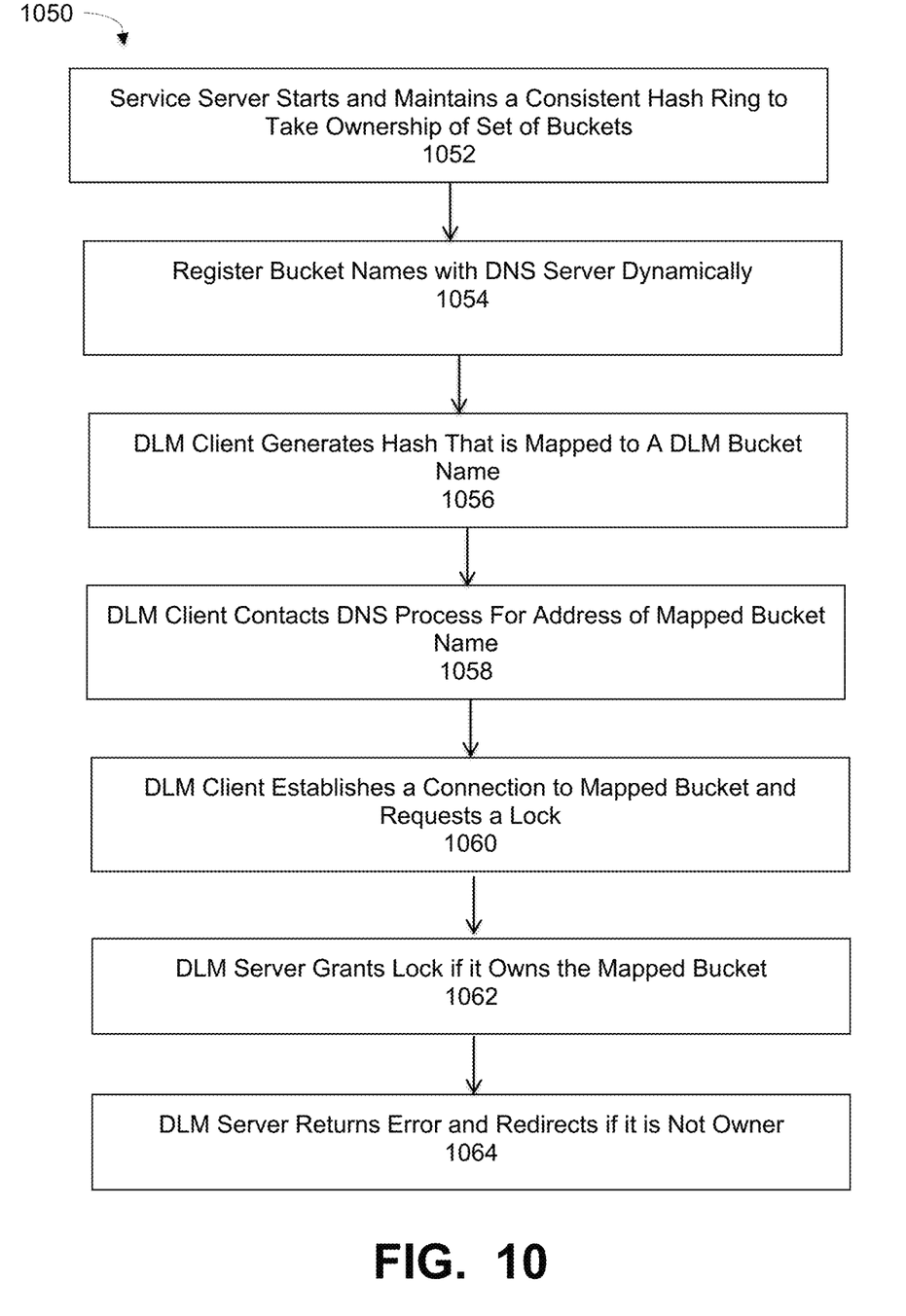
FIG. 10 is a flowchart that illustrates an interaction of DLM clients with the DLM servers, under an embodiment.

FIG. 10 is a flowchart that illustrates an interaction of DLM clients with the DLM servers, under an embodiment.

As shown in process 1050 of FIG. 10, all the DLM server services start and maintain a DLM Consistent Hash ring where each DLM server takes ownership of a set of buckets, 1052. Each bucket is responsible for processing a range of DLM locks. For example, bucket_1 (owns 1 to 500 locks), bucket_2 (owns 51 to 1000 locks), and so on. Bucket names are registered with the DNS server dynamically and each bucket name is mapped to the IP of the DLM server that owns the bucket, 1054, such as shown in Table 800 of FIG. 8. The DLM client generates a hash out of its lockID (lockid=mid:sid:inode_number), and this hash is mapped to a DLM bucket name, 1056. For example: Lock ID: 10:20:3000→Maps to Bucket: bucket_1.

The DLM client then contacts the DNS process for the IP address of the mapped bucket name. 1058. For example: bucket_1→DNS Lookup→10.227.100.26. The DLM client establishes a connection (e.g., GRPC/TCP etc.) to bucket_1 and requests a lock, 1060. If the DLM server service is the owner of the (bucket/)lock, the DLM lock is granted, 1062. Otherwise, if the DLM server service is not the owner of the (bucket)/lock, the not owner alert message is returned to the DLM client along with the referral to the new DLM Server/owner of bucket_1, 1064. The DLM client then retries connection to the new server and obtains the lock. DLM clients are completely unaware of changes in the cluster membership service and service/nodes coming up or down, has no effect on the operations of DLM clients. Clients using the services always utilize a resource without having to know who owns the resource.

As mentioned above, a Consistent Hash process is used to ensure that when a change or update in DLM lock ownership occurs, there is minimal change in the ownership of existing DLM locks. For the DLM example, or any other similar multi-thread, multi-resource example, a number (X) of locks (resource units) are distributed among a number (Y) of buckets. These numbers are typically initially defined by global system parameters based on user input and system configuration (e.g., 100 locks and 4 buckets) and are distributed equally with respect to locks per bucket using a Consistent Hash ring.

Figure 11:
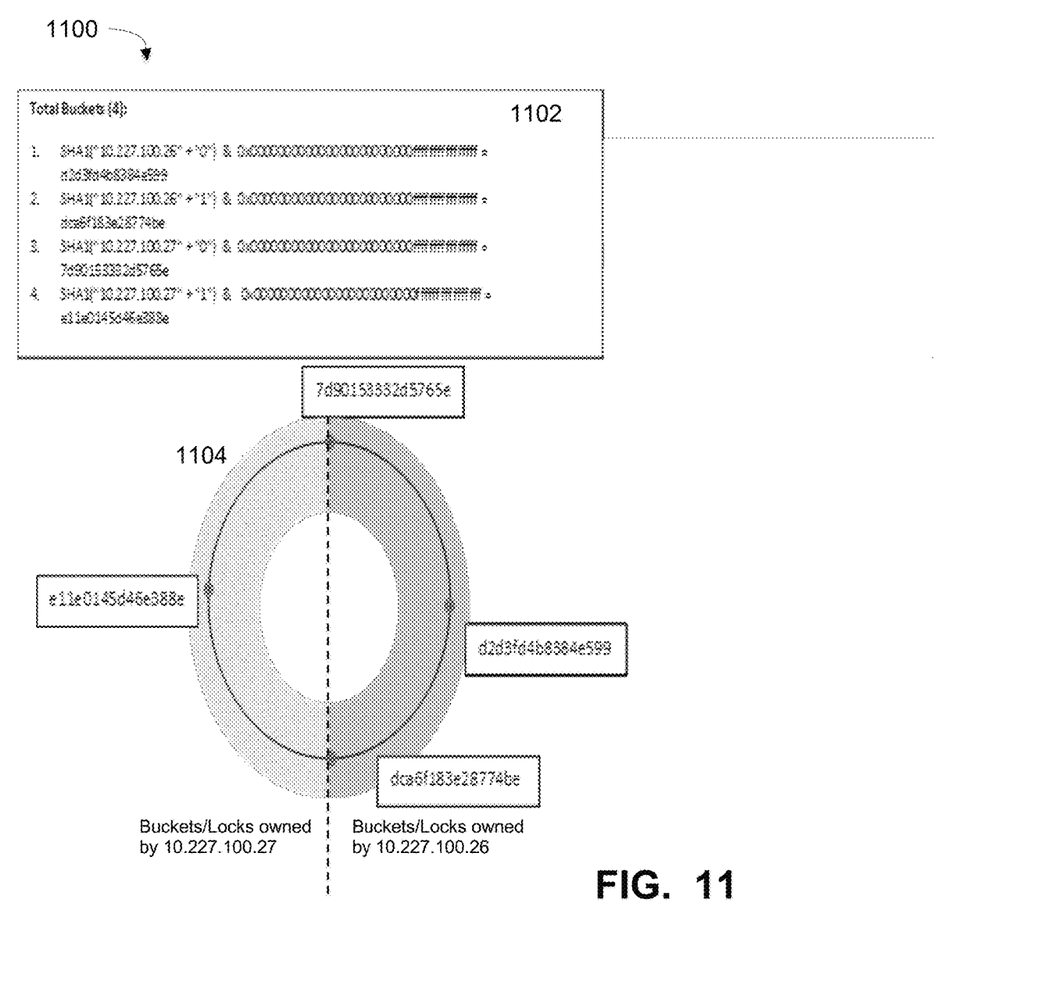
FIG. 11 illustrates the example use of a Consistent Hash ring in a service scaling process, under some embodiments.

FIG. 11 illustrates the example use of a Consistent Hash ring in a service scaling process, under some embodiments. The example of FIG. 11 shows hash values for four buckets 1102, and their distribution around Consistent Hash ring 1104. For the example of FIG. 11, assume that there are two DLM Servers with IP addresses 10.227.100.26 and 10.227.100.27, and a total number of 4 buckets with 2 buckets owned by each DLM server.

The function for Consistent Hash Ring can be expressed as follows:
dlm_hash_ring_t *ring=dlm_hash_ring_create(4, HASH_FUNCTION SHA1);
dlm_hash_ring_add_ms(ring, "10.227.100.26");
dlm_hash_ring_add_ms(ring, "10.227.100.27");

The total buckets in the DLM Consistent hash ring is four, as shown in FIG. 11, and the buckets are hashed as follows:
SHA1("10.227.100.26"+"0") & 0x00000000000000000000
0000ffffffffffffffff=d2d3fd4b8384e599 (bucket_1)
SHA1("10.227.100.26"+"1") & 0x00000000000000000000
0000ffffffffffffffff=dca6f183e28774be (bucket_2)
SHA1("10.227.100.27"+"0") & 0x00000000000000000000
0000ffffffffffffffff=7d90153332d5765e (bucket_3)
SHA1("10.227.100.27"+"1") & 0x00000000000000000000
0000ffffffffffffffff=e11e0145d46e388e (bucket_4)

Figure 12:
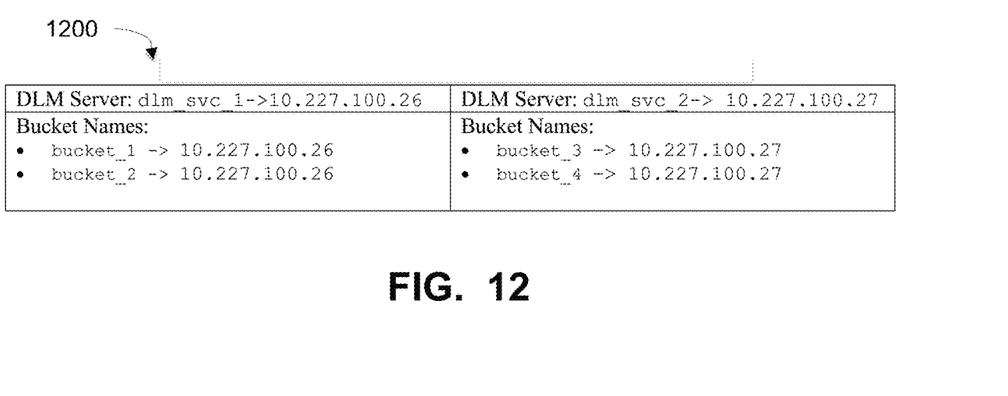
FIG. 12 is a table that illustrates ownership of DLM buckets a DNS mapping of bucket name to hostname for the Consistent Hash Ring of FIG. 11, under an example embodiment.

For this example, the ownership of DLM buckets and its DNS mapping of bucket name to hostname would be as shown in Table 1200 of FIG. 12.

For this example, assume the DLM client needs to find out which DLM server it needs to send its lock request. This is achieved by calculating SHA1 hash of lockid(<lck_type>: <mid>:<sid>:<inum>) and mapping it to a bucket ID to process the DLM lock in the hash ring. For example:
DLM Client lockid: 01:11:21:0031, Hash: 907a41c4aeadec6, DLM Bucket: bucket_1
DLM Client lockid: 06:16:26:0036, Hash: 5467d1cbe8ec5031, DLM Bucket: bucket_4

For the first request, client would open a connection (e.g., gRPC) to bucket_1, and bucket_1 would get resolved to 10.227.100.26 by the DNS server. The DLM lock will be processed by 10.227.100.26 DLM server. For the second request, client would open a connection to bucket_4, which would be resolved to 10.227.100.26 by the DNS server. The DLM lock will be processed by 10.227.100.27 DLM server. In this way, the client is redirected to the new service if the request goes to a service that does not own the lock.

The Consistent Hash Ring maps the resource (e.g., lock range to different buckets and divides the buckets amongst different service instances in a consistent manner. The buckets (and the resources they map to), get rebalanced and redistributed upon a cluster service membership change, where the membership services propagate subscribed services membership changes to all of the servers. Clients using the services (and its resources) can remain completely unaware of the membership changes in cluster. Thus, clients using the services always utilize a resource without having to know who owns the resource.

Figure 13:
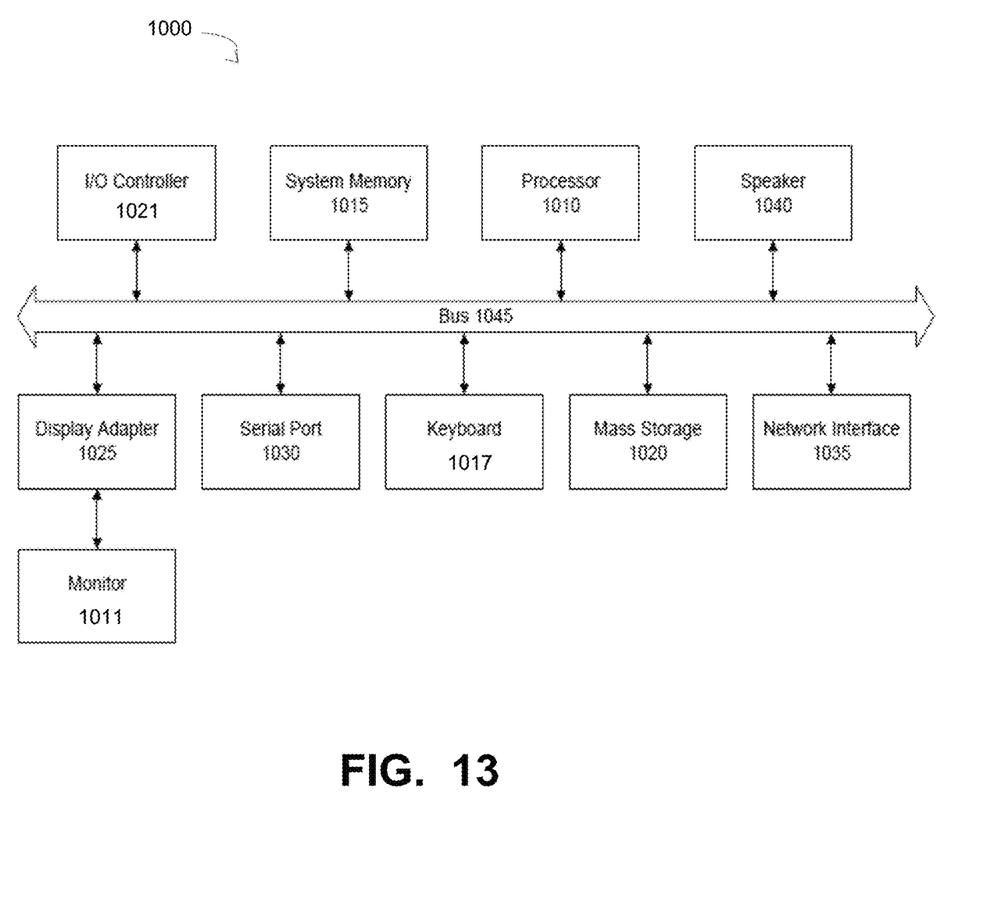
FIG. 13 is a block diagram of a computer system used to execute one or more software components of an event injection process for simulating error conditions in a distributed system, under some embodiments.

FIG. 13 is a block diagram of a computer system used to execute one or more software components of a service scaling process for distributed systems, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "of" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of scaling services in a distributed network, comprising:
    registering, with a Domain Name Service (DNS) server, bucket names for buckets each containing a number of resources used by a client, and held by a service server maintained in a Kubernetes container;
    distributing the resources across service servers of the network using a Consistent Hashing Ring process;
    maintaining, by a membership services process, a membership group listing service servers in the network;
    coordinating, upon occurrence of a load condition that requires scaling of services and resources, the scaling through a Kubernetes Event Service that defines join and leave events for the service servers;
    propagating changes to the network by the scaling to the service servers in the membership group;
    updating a mapping of buckets to host names of service servers of the membership group caused by the mapping; and
    directing a resource request from the client to the mapped buckets by resolving any changed bucket to service server assignments through a DNS resolver process.

2. The method of claim 1 wherein the scaling comprises a load balancing or sharding of resources that each instance of the service server can accommodate.

3. The method of claim 2 further comprising:
    dividing the resource into a set of buckets, wherein each instance of the service server owns a corresponding set of buckets;
    receiving, upon the scaling, an ordered set of reconfiguration events with the membership group listing indicating services to be added or deleted; and
    redistributing buckets among the service servers upon receiving the reconfiguration events.

4. The method of claim 3 wherein the membership services process keeps a record of service servers joining or leaving the network to manage the ordered set of reconfiguration events.

5. The method of claim 4 further comprising, upon a reconfiguration event:
    updating the membership group listing to include or delete service servers added or dropped by the reconfiguration event to generate an updated membership group list; and
    adding or dropping, by each service server of the updated membership group list, ownership of respective resources owned by each service server to balance the load in the system in accordance with the scaling.

6. The method of claim 1 wherein the service server comprises a Distributed Lock Manager (DLM) server, and wherein the resource comprises a lock.

7. The method of claim 6 wherein the lock is used by the client to lock a data asset or process executable by the network to prevent contention with another client.

8. The method of claim 1 wherein the Consistent Hash Ring process resizes a hash table for the service servers through a remapping of only a fractional value based on the number of resources and buckets.

9. A method of scaling services in a distributed network, comprising:
    maintaining a Consistent Hash Ring distributing buckets holding resources among a plurality of servers in the distributed network;
    registering bucket names of the buckets with a Domain Name Server (DNS);
    generating, by a client, a hash value mapped to a bucket name for obtaining an address of the mapped bucket name from the DNS server;
    establishing a connection to the mapped bucket to request a resource held in the bucket; and
    receiving the resource from a server holding the mapped bucket if the server owns the mapped bucket, otherwise, receiving an error message if the server does not own the mapped bucket.

10. The method of claim 9 further comprising:
    maintaining, by a membership services process, a membership group listing servers in the network;
    coordinating, upon occurrence of a load condition that requires scaling of services and resources, the scaling through a Kubernetes Event Service that defines join and leave events for the servers;
    propagating changes to the network by the scaling to the servers in the membership group;
    updating a mapping of buckets to host names of servers of the membership group caused by the mapping; and
    directing a resource request from the client to the mapped buckets by resolving any changed bucket to server assignments through a DNS resolver process.

11. The method of claim 10 wherein the scaling comprises a load balancing or sharding of resources that each instance of the server can accommodate.

12. The method of claim 11 further comprising:
    dividing the resource into a set of buckets, wherein each instance of the server owns a corresponding set of b buckets;
    receiving, upon the scaling, an ordered set of reconfiguration events with the membership group listing indicating services to be added or deleted; and redistributing buckets among the servers upon receiving the reconfiguration events.

13. The method of claim 12 wherein the membership services process keeps a record of servers joining or leaving the network to manage the ordered set of reconfiguration events.

14. The method of claim 13 further comprising, upon a reconfiguration event:
updating the membership group listing to include or delete servers added or dropped by the reconfiguration event to generate an updated membership group list; and
adding or dropping, by each server of the updated membership group list, ownership of respective resources owned by each server to balance the load in the system in accordance with the scaling.

15. The method of claim 14 wherein the Consistent Hash Ring process resizes a hash table for the servers through a remapping of only a fractional value based on the number of resources and buckets.

16. The method of claim 9 wherein the server comprises a Distributed Lock Manager (DLM) server, and wherein the resource comprises a lock.

17. The method of claim 16 wherein the lock is used by the client to lock a data asset or process executable by the network to prevent contention with another client.

18. A system for scaling services in a distributed network, comprising:
a Domain Name Service (DNS) server registering bucket names for buckets each containing a number of resources used by a client, and held by a service server maintained in a Kubernetes container;
a Consistent Hashing component distributing the resources across service servers of the network in a Consistent Hashing Ring data structure;
a membership services component maintaining a membership group listing service servers in the network;
a Kubernetes Event Service component coordinating, upon occurrence of a load condition that requires scaling of services and resources, the scaling to define join and leave events for the service servers; wherein the membership services component propagates changes to the network by the scaling to the service servers in the membership group, and updates a mapping of buckets to host names of service servers of the membership group caused by the mapping; and
a DNS resolver component directing a resource request from the client to the mapped buckets by resolving any changed bucket to service server assignments.

19. The system of claim 18 wherein the service server comprises a Distributed Lock Manager (DLM) server, and wherein the resource comprises a lock, and further wherein the lock is used by the client to lock a data asset or process executable by the network to prevent contention with another client.

20. The system of claim 19 wherein the scaling comprises a load balancing or sharding of resources that each instance of the service server can accommodate.

* * * * *